(12) United States Patent
Kurogi et al.

(10) Patent No.: US 6,886,415 B1
(45) Date of Patent: May 3, 2005

(54) TACTILE SENSOR AND GRIPPING ROBOT USING THE SAME

(75) Inventors: Shiro Kurogi, Yokohama (JP); Yoshiro Nojiri, Yokohama (JP); Yuji Nemoto, Yokohama (JP); Naomichi Hirama, Yokohama (JP); Nobutaka Tsujiuchi, Kyotanabe (JP); Kazumi Koketsu, Uji (JP); Yotaro Tsutiya, Uji (JP)

(73) Assignees: Toshiba Electric Engineering Corporation, Yokohama (JP); The Doshisha, Kyoto (JP); TEC Gihan Corporation, Kazuragi-gun (JP)

( * ) Notice: Subject to any disclaimer, the term of this patent is extended or adjusted under 35 U.S.C. 154(b) by 31 days.

(21) Appl. No.: 10/909,410

(22) Filed: Aug. 3, 2004

(51) Int. Cl.[7] .............................................. G01L 1/22
(52) U.S. Cl. .................................................. 73/862.045
(58) Field of Search .................... 73/862.041, 862.042, 73/862.043, 862.044, 862.045, 862.046

(56) References Cited

U.S. PATENT DOCUMENTS

| | | | | |
|---|---|---|---|---|
| 3,800,895 A | * | 4/1974 | Gale et al. ................... | 177/136 |
| 3,968,683 A | * | 7/1976 | Ormond ................. | 73/862.622 |
| 5,234,066 A | * | 8/1993 | Ahsing et al. ............... | 180/6.5 |
| 5,511,571 A | * | 4/1996 | Adrezin et al. ................ | 135/66 |
| 6,269,702 B1 | * | 8/2001 | Lambson ................ | 73/862.045 |
| 6,516,749 B1 | * | 2/2003 | Salasidis ...................... | 119/421 |

FOREIGN PATENT DOCUMENTS

| | | |
|---|---|---|
| JP | 8-323678 | 12/1996 |
| JP | 2000-266620 | 9/2000 |
| JP | 2002-181640 | 6/2002 |

* cited by examiner

*Primary Examiner*—Max Noori
(74) *Attorney, Agent, or Firm*—Oblon, Spivak, McClelland, Maier & Neustadt P.C.

(57) ABSTRACT

Disclosed is a tactile sensor which includes: a disk-shaped first strain generating section; plate-shaped second to fifth strain generating sections each provided as an extension of the first strain generating section extended from one of four substantially equiangular peripheral edge portions of the first strain generating section, each of the second to fifth strain generating sections being structured to support the first strain generating section as a leg thereof; first to fourth foot sections extended at a side different from a first strain generating section side respectively from the second to fifth strain generating sections; a diaphragm type first strain gauge attached to a discoid surface of the first strain generating section; and second to fifth strain gauges attached respectively to planer surfaces of the second to fifth strain generating sections, and a gripping robot using the tactile sensor for detecting contact pressure.

8 Claims, 12 Drawing Sheets

TACTILE SENSOR AND GRIPPING ROBOT USING THE SAME

BACKGROUND

1. Field of the Invention

The present invention relates to a tactile sensor that detects force (pressure) applied to an attachment surface and a gripping robot using the tactile sensor that detects contact pressure, and more specifically, to the tactile sensor suitable for detecting three component forces (in the X direction, Y direction, and Z direction) with high accuracy from small force and the gripping robot using the same.

2. Description of the Related Art

As a tactile sensor of the kind attachable to a fingertip, there is one used in a "soft object grip device" disclosed in Japanese Patent Laid-Open Application No. Hei 8-323678, as an example. This sensor detects contact areas with a lot of minute ON/OFF switches provided therein. The sensor is intended to realize optimal gripping of an object by recognizing size and flexibility of the object from the relation between the detected contact areas and distances between fingertips. The sensor principally detects the force in the vertical direction (Z direction) to the attachment surface.

As a marketable product supplied in the market, there is a pressure distribution measurement system using a film sensor by Nitta Corporation, which uses a sensor sheet for measuring pressure distribution within a surface. The system is intended to measure high-density pressure distribution with the sensor sheet, whereas, the measurement is effective only for the pressure distribution in the Z direction as well.

In the "force detector" disclosed in Japanese Patent Laid-Open Application No. 2002-181640, there is shown a capacitance-operated force detection. This detector can detect the force in the X direction in addition to the force in the Z direction. The detection of the force in the Z direction is performed on the basis of ON/OFF switches, having limitations as force detection.

The "inner force sensor" disclosed in Japanese Patent Laid-Open Application No. 2000-266620 is constituted to be able to detect a total of six component forces consisting of the forces in the three directions and moments along three axes. The sensor has a structure in which strain gauges are mounted on a three-dimensional crucial rigid body. It is therefore impossible to attach the sensor to a surface of a skin or a fingertip because of the structure. In addition, it is considered that the sensor is unsuitable to detect small force with high accuracy due to the rigid body used therein.

[Patent document 1] JP-A 8-323678
[Patent document 2] JP-A 2002-181640
[Patent document 3] JP-A 2000-266620

SUMMARY

The present invention is made in consideration of the above-mentioned circumstances. Therefore, it is an object of the present invention to provide, a tactile sensor which detects force (pressure) applied to an attachment surface and a gripping robot using the tactile sensor that detects contact pressure, with the tactile sensor capable of detecting three component forces (in the X direction, Y direction, and Z direction) with high accuracy from small force and the gripping robot using the same.

In order to bring a solution to the above-described problems, the tactile sensor according to the present invention includes: a first strain generating section having a shape of a disk; second to fifth strain generating sections each of which is provided as a plate-shaped extension of the first strain generating section extended from one of peripheral edge portions of the first strain generating section that are divided into four substantially equiangular portions, each of the second to fifth strain generating sections being structured to support the first strain generating section as a leg of the first strain generating section; first to fourth foot sections extended at a side different from a first strain generating section side respectively from the second to fifth strain generating sections; a diaphragm type first strain gauge attached to a discoid surface of the first strain generating section; and second to fifth strain gauges attached respectively to planer surfaces of the second to fifth strain generating sections.

With the first strain gauge attached to the first strain generating section, the force (pressure) in the Z direction (vertical direction to the attachment surface) is detected, and with the second to fifth strain gauges respectively attached to the second to fifth strain generating sections supporting the first strain generating section, the forces (pressures) in the X direction and Y direction (parallel direction to the attachment surface (searing direction), respectively) are detected. Each strain generating section has a planer shape being easily bent, so that the detection can be performed from small force. Further, it is possible to improve detection accuracy for example by providing dedicated strain gauges for detecting the forces in respective directions, which serves to reduce mutual interference.

Further, another tactile sensor according to the present invention has the tactile sensors as elements aligned in an array. The tactile sensors as elements can be fabricated minutely for example by punching and bending of a plate material, so that it is easily possible to align them in an array. By adopting an array structure, a certain attachment area can be ensured as a tactile sensor. Backed by this, the detection of contact pressure in an attachment surface can be made more accurately.

Furthermore, a gripping robot according to the present invention includes the tactile sensor having the array structure for detecting contact pressure. The tactile sensor having the array structure can cover a certain area when attached and can be attached so as to comply with a rounded attachment surface. Accordingly, by attaching the tactile sensor for example to a fingertip, the gripping robot can perform desirable contact pressure detection with the help of the detection capability of the three component forces with high accuracy from small force.

DETAILED DESCRIPTION (Description of Embodiments)

Although embodiments according to the present invention will be described with reference to the drawings, those drawings are presented for the purpose only of illustration and in no case limit the present invention.

A tactile sensor as an aspect according to the present invention further includs sixth to ninth strain gauges in addition to the second to fifth strain gauges so that each of second to fifth strain generating sections has the strain gauges attached to both planer surfaces of the same. The strain gauges respectively attached both the planer surfaces of the second to fifth strain generating sections allow improvement in sensitivity since one of the surfaces shows output of compression and the other surface shows output of tension. Accordingly, three component forces can be detected from larger output even with small force. Further, by combining the strain gauges on both the surfaces, interference by the force detected by a first strain generating section can be avoided.

In the tactile sensor as an aspect, in the structure of the second to fifth strain generating sections supporting the first strain generating section, an angle between a disk of the first strain generating section and each of plates of the second to fifth strain generating sections is within the range from 90 degrees to 130 degrees. With this angle being adopted, it is possible to design so that the height as a tactile sensor can be curbed and, at the same time, area on planer surfaces of the second to fifth strain generating sections for attaching the strain gauges can be ensured. The angle of 90 degrees can be said to be the most common angle in view of simplicity of structure. However, by adopting a slightly larger angle than the 90 degrees, planer surface area can be easily ensured without increasing the height. In addition to that, an angle less than 90 degrees makes it difficult to form a strain generating section, attach a strain gauge, and wire a lead wire, and an angle more than 130 degrees makes the second to fifth strain generating sections difficult to bend even applied the force in the X direction or the Y direction, thereby the output lowers.

Further, in the tactile sensor as an aspect, there are formed recessed portions in the vicinity of extension boundaries between the first strain generating section- and the second to fifth strain generating sections so as to reduce discoid surface area of the first strain generating section or plate area of the second to fifth strain generating sections. With such recessed portions being provided, it is possible to reduce the occurrence ratio of unnecessary strain for the detection, the strain arising on the planer surfaces of the second to fifth strain generating sections. Accordingly, with smaller interference in each detecting direction, highly accurate force detection can be realized, so that detection accuracy is improved.

Further, in the tactile sensor as an aspect, there are formed the recessed portions in the vicinity of extension boundaries between the second to fifth strain generating sections and first to fourth foot sections so as to reduce the planar area, with same intention as mentioned above.

The tactile sensor as an aspect further includes wiring boards that supply respective terminals of the strain gauges respectively provided in the tactile sensors as elements with electrical wirings. The wiring board includes multilayered wiring layers and the tactile sensors as elements to be connected to each of the wiring layers are uniform. This is to supply wirings, which are to be connected to each of the elements of an array of the tactile sensors as elements, as a multi-layered wiring board. Since the tactile sensors as elements to be connected to respective wiring layers are uniform, the structure of the multi-layered wiring board can be simplified. For instance, a multi-layered structure having no through hole can be employed.

Figure 1A:
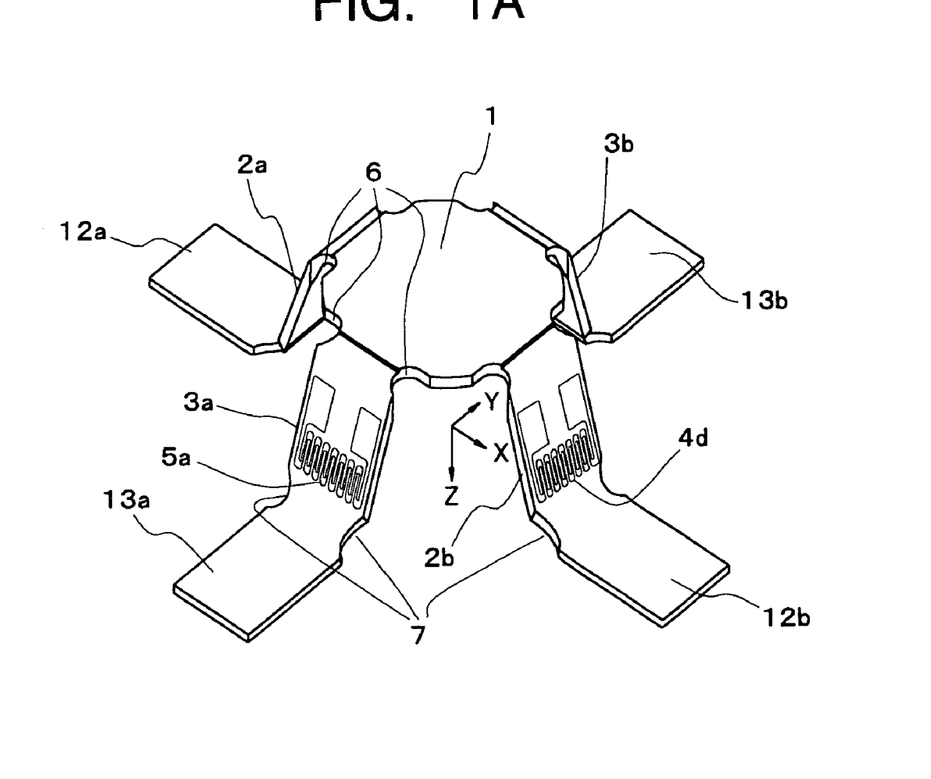
FIG. 1A and FIG. 1B are views schematically showing the structure of a tactile sensor of an embodiment according to the present invention.
Figure 1B:
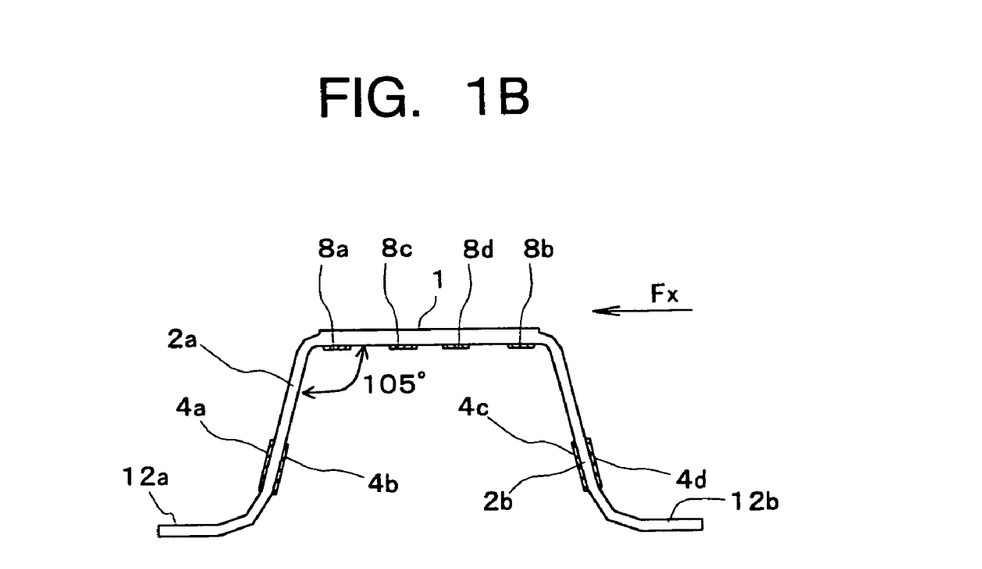

On the basis of the above, hereinafter, the embodiments according to the present invention will be described with reference to the drawings. The FIG. 1A and FIG. 1B are views schematically showing the structure of the tactile sensor of an embodiment according to the present invention. FIG. 1A is a perspective view, and FIG. 1B is a cross-sectional view showing the X direction (direction of a force in the X direction) from a side.

As shown in FIG. 1A and FIG. 1B, this tactile sensor is formed such that a strain generating section 1 having a shape of a disk is supported by strain generating sections 2a, 2b, 3a, 3b each having a shape of a plate and extended from one of peripheral edge portions of the strain generating section 1 that are divided into four substantially equiangular portions. The plate-shaped strain generating sections 2a, 2b, 3a, 3b serve as legs of the discoid strain generating section 1, and at a side thereof which is opposite to a strain generating section 1 side, there are provided foot sections 12a, 12b, 13a, 13b for fixing the tactile sensor to an attachment surface.

On an undersurface of the discoid strain generating section 1, there are attached diaphragm type strain gauges 8a, 8b, 8c, 8d. On both respective surfaces of the plate-shaped strain generating sections 2a, 2b, 3a, 3b, there are attached strain gauges 4a, 4b, 4c, 4d, 5a, . . . (eight pieces in total). For the diaphragm type stain gauges 8a, 8b, 8c, 8d, detailed description will be provided later with reference to FIG. 2. The strain gauges 4a, 4b, 4c, 4d, 5a, . . . on the plate-shaped strain generating sections 2a, 2b, 3a, 3b are attached such that their longitudinal directions are in parallel with the directions from the peripheral edge of the strain generating section 1 to the corresponding foot sections 12a, 12b, 13a, 13b, so that a strain detection is performed in response to a distortion such as a bend in each plate in the directions from the peripheral edge of the strain generating section 1 to the corresponding foot sections 12a, 12b, 13a, 13b.

The angle between the discoid strain generating section 1 and the plate-shaped strain generating sections 2a, 2b, 3a, 3b being respective legs of the strain generating section 1 is set to 105 degrees in the present embodiment. This is to ensure the area for the plate-shaped strain generating sections 2a, 2b, 3a, 3b without largely increasing the height as a tactile-sensor by employing the angle of 105 degrees somewhat larger than the angle of 90 degrees. Incidentally, more obtuse angle can lower the height as a tactile sensor, whereas, the area in the planar direction increases, so that arrangement density as a tactile sensor is forced to be reduced. In order to curb a size represented by the height to a certain small level and to ensure a certain arrangement density, the angle within the range approximately from 90 degrees to 130 degrees is considered to be an appropriate design. Among these, the angle approximately from 100 degrees to 110 degrees serves to ensure the area of the plate-shaped strain generating sections 2a, 2b, 3a, 3b, so that the strain gauges 4a, 4b, 4c, 4d, 5a, . . . are favorably mounted.

A specific size, for example, is approximately from 1 mm to 3 mm in height, and approximately from 5 mm to 15 mm in entire length in the X and Y directions including the foot sections 12a, 12b, 13a, 13b. The thickness of the plates of the strain generating sections 1, 2a, 2b, 3a, 3b is, for example, approximately from 0.05 mm to 0.3 mm. As a material, a material that exhibits moderate stiffness, for example, metal or resin such as copper alloy and stainless steel can be employed. When employing metal, for example, the tactile sensor can be fabricated or manufactured easily by punching and bending. When employing resin, the tactile sensor can be fabricated by molding using for example a metal mold.

As shown in the drawings, further, in the vicinity of the boundaries between the discoid strain generating section 1 and the plate-shaped strain generating sections 2a, 2b, 3a, 3b, there are formed recessed portions 6 so as to reduce the areas of these disk and plates (it is acceptable to narrow either the disk or the plates). Also, in the vicinity of the boundaries between the plate-shaped strain generating sections 2a, 2b, 3a, 3b and the foot sections 12a, 12b, 13a, 13b, there are formed recessed portions 7 so as to reduce the plate area of these plates. These recessed portions 6, 7 are provided to boost the strains arising in the plate-shaped strain generating sections 2a, 2b, 3a, 3b and detected by the strain gauges 4a, 4b, 4c, 4d, 5a, . . . as much as possible.

Specifically, when detecting for example the force in the x direction, it is preferable that the strain generating sections 2a, 2b are easily bendable for obtaining higher pressure detection capability. Meanwhile, responding to the force in the X direction, bending stress arises around normal lines of the surfaces of the strain generating sections 3a, 3b, which leads to extremely high stiffness. Therefore, with the provision of the recessed portions 6, 7 as described above, the bending stress around the normal lines of the surfaces of the strain generating sections 3a, 3b is concentrated, so that the strain generating sections 2a, 2b become easily bendable (become easily deformable in the X direction). The same applies to the force in the Y direction. Hence, the detection is allowed even with the small force.

Incidentally, although it is omitted to be illustrated in FIG. 1A and FIG. 1B, a material with flexibility such as, as an example, a polyurethane rubber may be bonded to on an upper surface of the discoid strain generating section 1 for obtaining a buffer function for cushioning weight.

Figure 2:
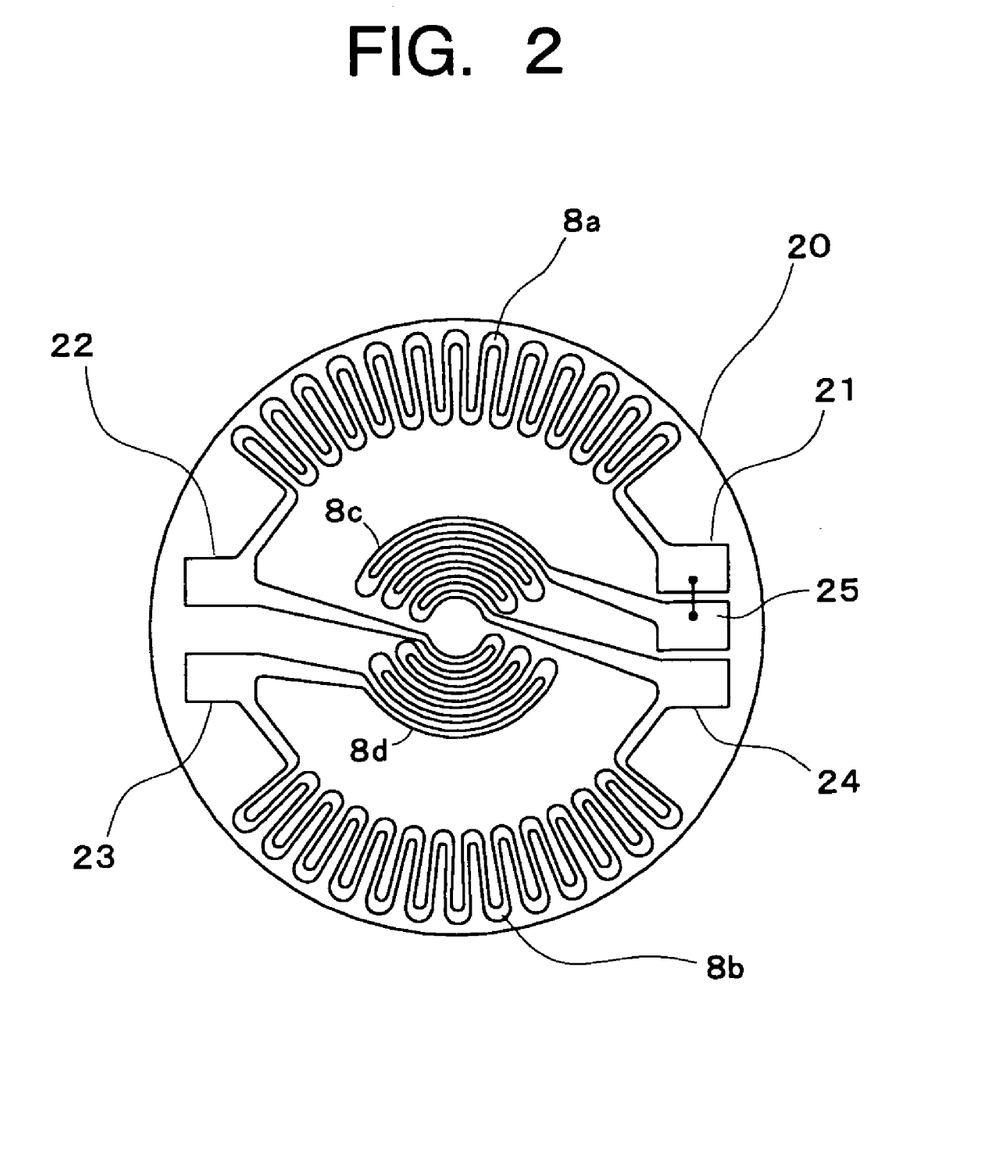
FIG. 2 is a view schematically showing, in an enlarged illustration, the configuration of diaphragm type strain gauges 8a, 8b, 8c, 8d attached to an undersurface of a discoid strain generating section 1 in FIG. 1.

FIG. 2 is a view schematically showing in an enlarged illustration the configuration of the diaphragm type strain gauges 8a, 8b, 8c, 8d attached to the undersurface of the discoid strain generating section 1. In FIG. 2, the same reference numerals are used to designate the corresponding components as those in FIG. 1A and FIG. 1B.

As shown in FIG. 2, the stain gauges 8a, 8b, 8c, 8d are provided on a circular film 20 as a whole. As for arrangement of wires composing the stain gauges 8a, 8b, 8c, 8d, a wire is arranged from a connection pad 21 to a connection pad 22 via the stain gauges 8a of which longitudinal direction is arranged in the radial direction of the circular film 20, also a wire is arranged from the connection pad 22 to a connection pad 23 via the stain gauges 8d of which longitudinal direction is arranged in the circumferential direction of the circular film 20, further a wire is arranged from the connection pad 23 to a connection pad 24 via the stain gauges 8b of which longitudinal direction is arranged in the radial direction of the circular film 20, and still further a wire is arranged from the connection pad 24 to a connection pad 25 via the stain gauges 8c of which longitudinal direction is arranged in the circumferential direction of the circular film 20.

The stain gauges 8a, 8b, of which longitudinal directions are arranged in the radial direction of the circular film 20, are provided at sides in the vicinity of the peripheral edge of the film 20 such that they face to each other on the film 20. The stain gauges 8c, 8d, of which longitudinal directions are arranged in the circumferential direction of the circular film 20, are provided at sides in the vicinity of the center of the film 20 such that they face to each other.

The stain gauges 8a, 8b at the peripheral edge side and the strain gauges 8c, 8d at center side detect mutually opposite strains (namely, compressive strain and tensile strain), respectively, in response to a deformation of the strain generating section 1. The description in this regard will be given later. Incidentally, as shown in the drawings, hereinbelow, a resistance value of the strain gauge 8a at one peripheral edge side is denoted by $Z1a$, the resistance value of the strain gauge 8b at the other peripheral edge side is denoted by $Z1b$, the resistance value of the strain gauge 8c at one center side is denoted by $Z2a$, and the resistance value of the strain gauge 8d at the other center side is denoted by $Z2b$, respectively.

Figure 3A:
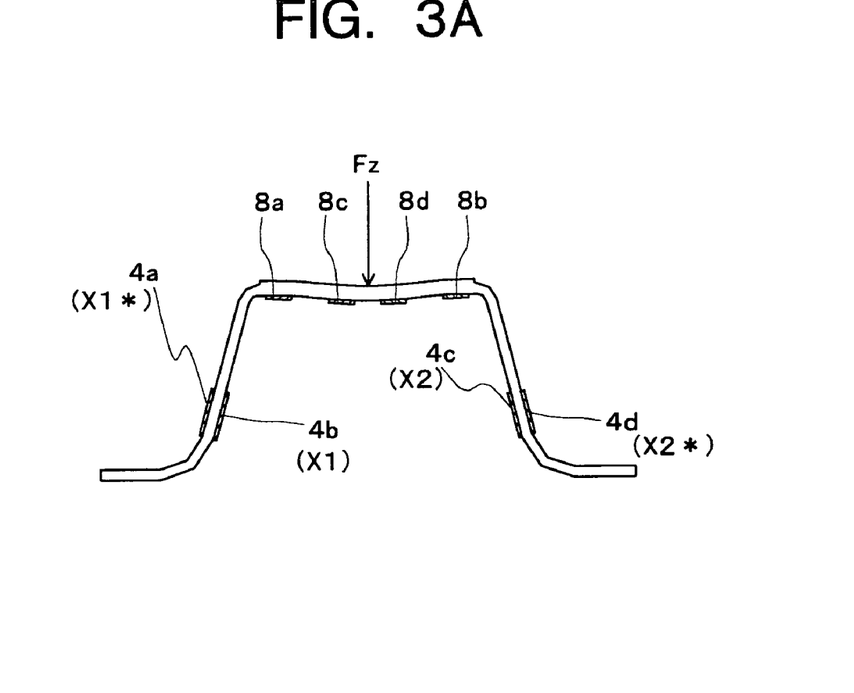
FIG. 3A, FIG. 3B, and FIG. 3C are views for explaining a principle of the tactile sensor shown in FIG. 1A and FIG. 1B detecting a force in the Z direction.
Figure 3B:
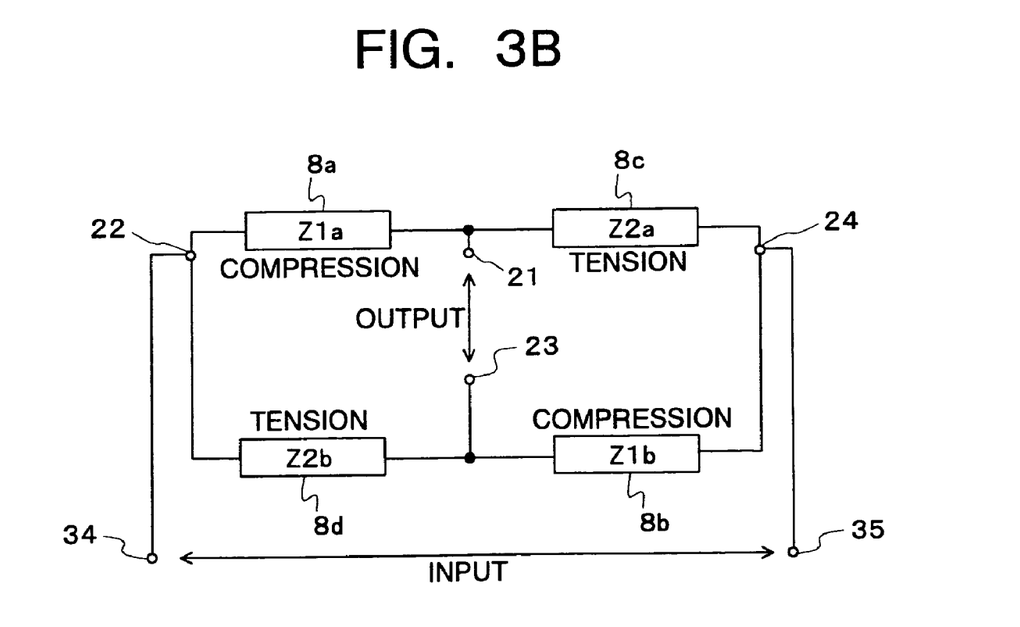
Figure 3C:
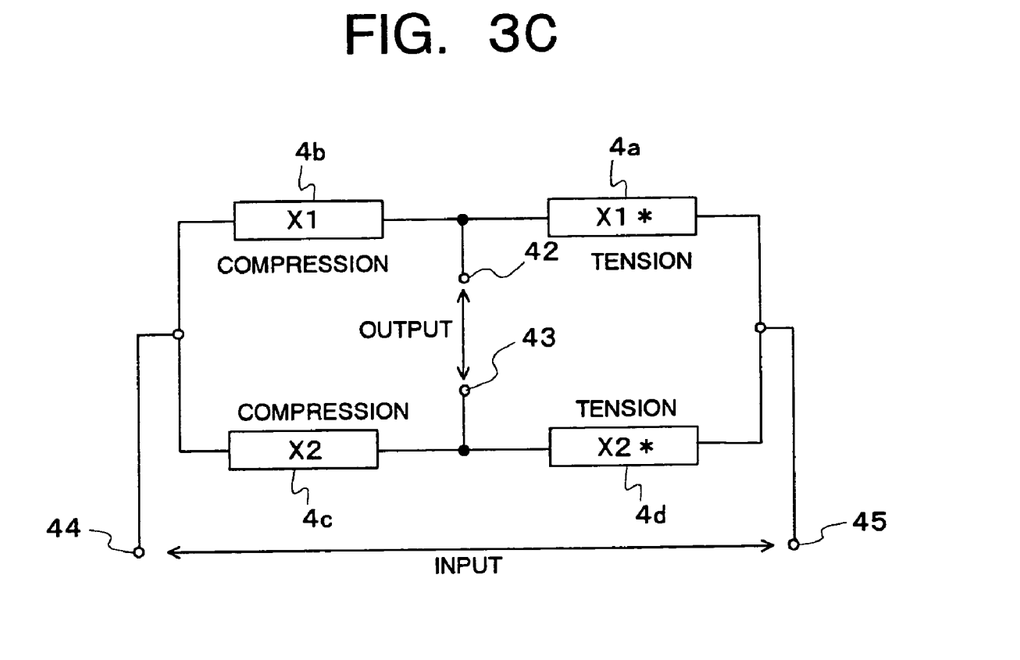

FIG. 3A, FIG. 3B, and FIG. 3C are views for explaining a principle of the tactile sensor shown in FIG. 1A and FIG. 1B which detects the force in the Z direction. In FIG. 3A, FIG. 3B and FIG. 3C, the same reference numerals are used to designate the corresponding components as those already described in the above.

As shown in FIG. 3A, when a force Fz in the Z direction is applied to the tactile sensor, there arise deformations in the diaphragm type stain gauges 8a, 8b, 8c, 8d in accordance with the strains. Specifically, the deformations in the strain gauges 8c, 8d at the center side are those in response to tension, and the deformations in the strain gauges 8a, 8b at the peripheral edge side are those in response to compression. The strain gauges 8a, 8b at the peripheral edge side are deformed in response to compression since there exists a neutral position between the strain gauges 8c, 8d at the center side and the strain gauges 8a, 8b at the peripheral edge side. At the center side from the neutral position, the strain generating section 1 bends to protrude downward, and at the peripheral edge side from the neutral position, the strain generating section 1 bends to protrude upward.

As shown in FIG. 3B, the stain gauges 8a, 8b, 8c, 8d are connected so as to configure a bridge. From a pair of input terminals 34, 35 of the bridge, input voltage (current is acceptable instead) is applied and output is made from between a pair of output terminals 21, 23. When there is no deformation in the stain gauges 8a, 8b, 8c, 8d, if resistances of the stain gauges 8a, 8b, 8c, 8d are adjusted to satisfy a balance condition: $Z1a \times Z1b = Z2a \times Z2b$ (=products of impedances of facing elements are the same), they are unbalanced when the stain gauges 8a, 8b, 8c, 8d show a change in resistance.

As described in the above, the resistances of the strain gauges 8c, 8d at the center side up in response to tension, and the resistances of the stain gauges 8a, 8b at peripheral edge side down in response to compression. Accordingly, when the strain generating section 1 detects the force in the Z direction, there arises voltage between the connection pad 21 and the terminal 23. With the detection of this voltage (or current on the back of this voltage), the force in the Z direction can be detected. The force detection is in proportion to the Fz with accuracy within elastic limit of the strain generating section 1.

FIG. 3C is a view showing the deformations of the strain gauges 4a, 4b, 4c, 4d for detecting the force in the X direction when the force Fz in the Z direction is applied. (Note that the following description is also applicable to the strain gauges 5a, . . . for detecting the force in the Y direction.)

When the force Fz in the Z direction is applied, the strains arise also in the strain generating sections 2a, 2b on which the strain gauges 4a, 4b, 4c, 4d are mounted. As is understood from the structure shown in FIG. 3A, the strains are the tensile strains for the outside strain gauges 4a, 4d, and the compressive strains for the inside strain gauges 4b, 4c.

Here, as shown in FIG. 3C, the strain gauges 4a, 4b, 4c, 4d are connected to configure the bridge. Specifically, they are connected such that the strain gauge 4b mounted inside of one of the mutually facing strain generating sections 2a, 2b and the strain gauge 4d mounted outside of the other strain generating section configure one of facing elements of the bridge, and the strain gauge 4a mounted inside one of the mutually facing strain generating sections 2a, 2b and the strain gauge 4c mounted outside the other strain generating section configure the other facing element of the bridge. Then, input is made from a pair of input terminals 44, 45 of this bridge and output is obtained from between a pair of output terminals 42, 43.

In such a bridge structure, with the above-mentioned strain, a resistance value X1 of the strain gauge 4b is reduced and a resistance value X1* of the strain gauge 4a increases, and a resistance value X2 of the strain gauge 4c is reduced and a resistance value X2* of the strain gauge 4d increases, so that the balance condition of the bridge circuit: X1×X2*=X2×X2* still remains to be satisfied. In this regard, interference from the detection of the Fz to the detection of the Fx (or detection of the Fy) is largely reduced. This is a big advantage of this embodiment.

Figure 4A:
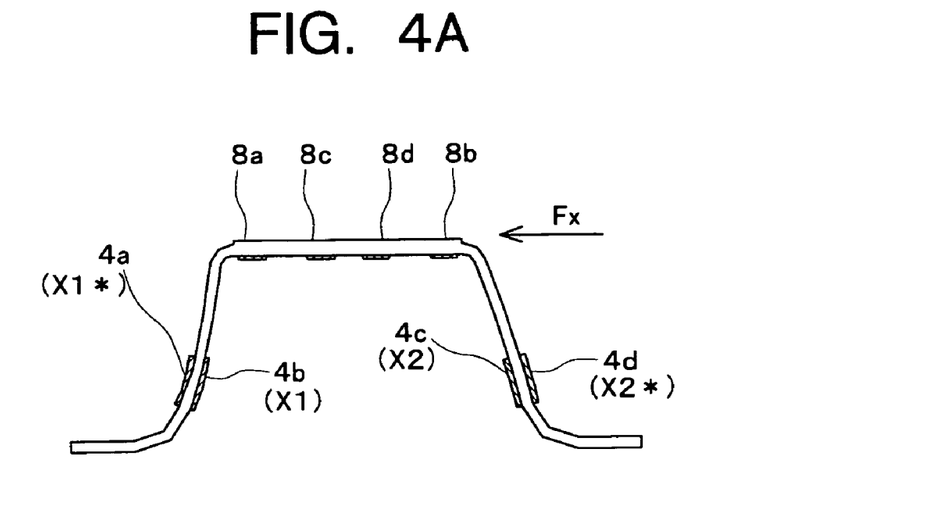
FIG. 4A, FIG. 4B, and FIG. 4C are views for explaining a principle of the tactile sensor shown in FIG. 1A and FIG. 1B detecting the force in the X direction.
Figure 4B:
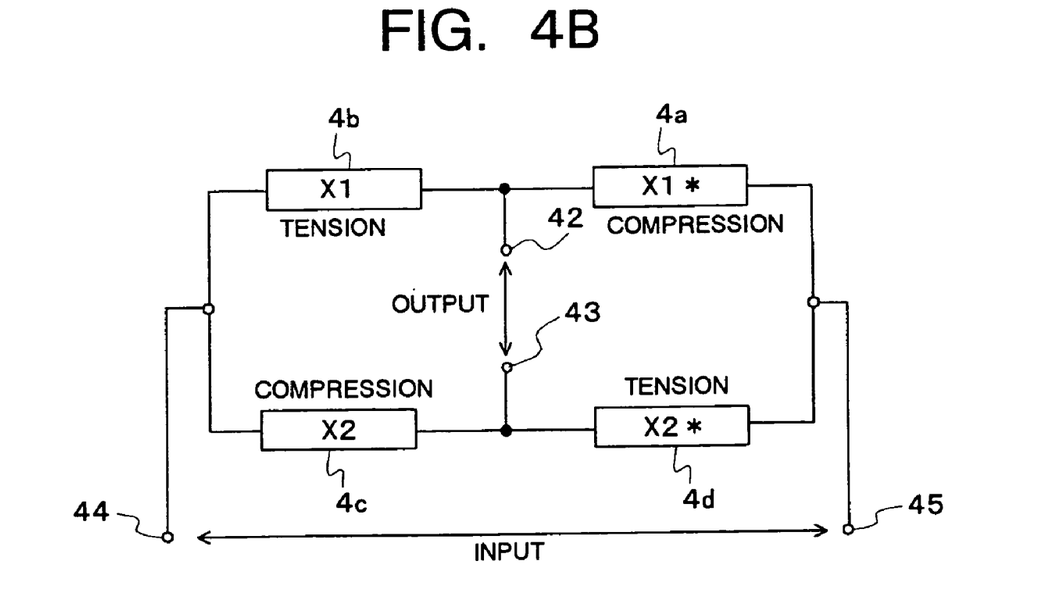
Figure 4C:
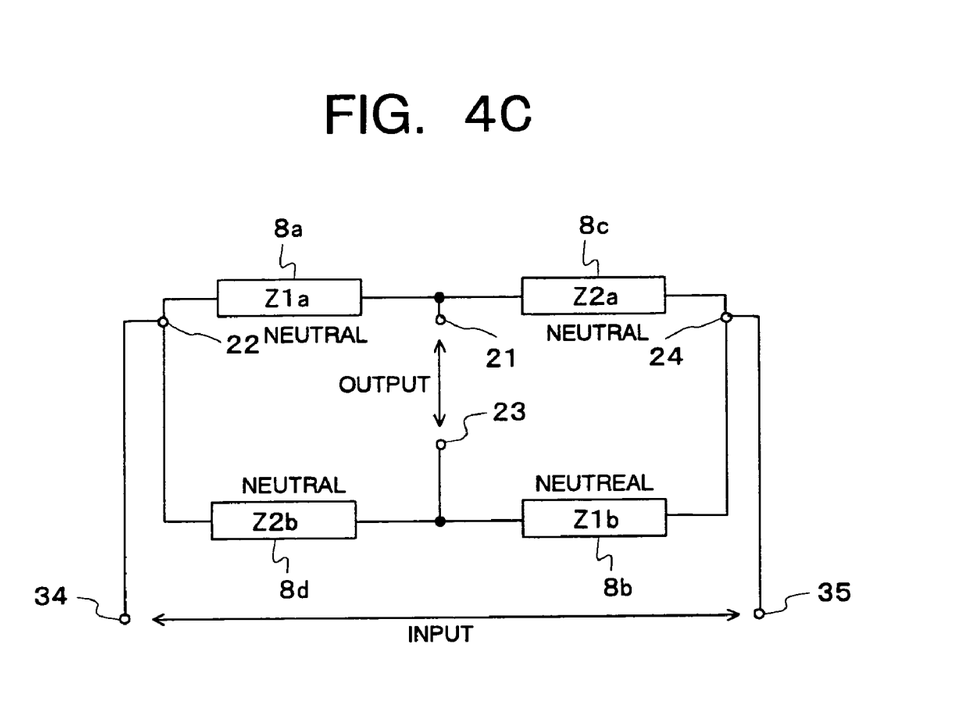

FIG. 4A, FIG. 4B, and FIG. 4C are views showing the principle of the tactile sensor shown in FIG. 1A and FIG. 1B detecting the force in the X direction. In FIG. 4A, FIG. 4B and FIG. 4C, the same reference numerals are used to designate the corresponding components as those already described in the above. (Note that the description given for FIG. 4A, FIG. 4B, and FIG. 4C is also applicable to the description for the principle of detecting the force in the Y direction.)

As shown in FIG. 4A, when the force Fx in the X direction is applied to the tactile sensor, there arise the deformations in the stain gauges 4a, 4b, 4c, 4d mounted on the mutually facing strain generating sections 2a, 2b, in accordance with the strains. Specifically, as shown in the drawings, the deformations in the strain gauge 4a mounted outside the strain generating section 2a at the output direction side of the force Fx and the strain gauges 4c mounted inside the strain generating section 2b at the input direction side of the force Fx are those in response to compression, and the deformations in the strain gauge 4b mounted inside the strain generating section 2a at the output direction side of the force Fx and the strain gauges 4d mounted outside the strain generating section 2b at the input direction side of the force Fx are those in response to tension.

As already described in the above, the strain gauges-4a, 4b, 4c, 4d are connected to configure the bridge shown in FIG. 4B. Therefore, with the above-described deformation, the resistance value X1 of the strain gauge 4b increases, the resistance value X1* of the strain gauge 4a is reduced, the resistance value X2 of the strain gauge 4c is reduced, and the resistance value X2* of the strain gauge 4d increases, so that the balance condition of the bridge circuit: X1×X2*=X2×X1* is unbalanced. Backed by this, voltage arises between the pair of output terminals 42, 43. With the detection of this voltage (or current on the back of this voltage), the force in the X direction can be detected. The force detection is in proportion to the Fx with accuracy within elastic limit of the strain generating sections 2a, 2b.

FIG. 4C is a view showing the deformations of the strain gauges 8a, 8b, 8c, 8d for detecting the force in the Z direction when the force Fx in the X direction is applied. Even if the force Fx in the X direction is applied, as shown in FIG. 4A, there arises almost no strain in the strain generating section 1 on which the stain gauges 8a, 8b, 8c, Bd are mounted.

Accordingly, in the previously-described bridge circuit for detecting the force in the Z direction, there is almost no change in resistance of the stain gauges 8a, 8b, 8c, 8d, as shown in FIG. 4C, so that the bridge circuit is kept to be balanced. Specifically, as a result, there is little interference from the detection of the force Fx (or detection of the force Fy) to the detection of the force Fz.

As has been described in the above, according to the present embodiment, strain generating sections 1, 2a, 2b, 3a, 3b are formed to have a planar shape; there are provided recessed portions in the vicinity of the boundaries between the strain generating sections or between the strain generating sections and other sections; and strain gauges 4a, 4b, 4c, 4d, 5a, . . . (eight pieces in total) are mounted on the strain generating sections 2a, 2b, 3a, 3b serving as legs, the strain gauges 4a, 4b, 4c, 4d, 5a, . . . being connected so as to configure two bridge circuits. On the basis of the above, it is possible to substantially reduce mutual interference to thereby carry out highly accurate detection of three component forces (in the x direction, Y direction, Z direction) from small force.

It should be noted that the configuration of the bridging connection shown in FIG. 4A may be changed as described below. Specifically, 4a and 4c are connected (namely, X2+X1* is arranged) to the position of 4a in FIG. 4A, and 4d and 4b are connected (namely, X1+X2* is arranged) to the position of 4d in FIG. 4A, respectively, and to the remaining positions 4d and 4c, an external fixed resistor is connected to thereby configure the bridge. Also, in this structure, the same detection sensitivity can be obtained, and in addition to that, an effect of avoiding the interference from the force Fz in the Z direction is obtained, as was described with reference to FIG. 3C.

[First Example]

Hereinbelow, examples will be described. As a first example, a tactile sensor is formed by punching a metal plate having a thickness of 0.1 mm into a cross shape using a press and by bending it so as to leave a center planer portion as shown in FIG. 1. The height of the tactile sensor is set to 1.6 mm.

The input voltage into a bridge circuit by strain gauges 4a, 4b, 4c, 4d (5a, . . . ) is set to 5V. The nominal resistance values of the strain gauges 4a, 4b, 4c, 4d (5a, . . . ) are 350 Ω, respectively. After fixing undersurfaces of four foot sections 12a, 12b. 13a, 13b of the tactile sensor to an attachment surface, a force Fx=250 g is applied in the X direction. The evaluation items are three: output voltage of a bridge circuit, interference between a detection of Fx and a detection of Fy, and nonlinearity in Fx detection.

As a result obtained from the above, the output voltage of the bridge circuit was 1.7 mV to 1.8 mV, the interference between the detection of Fx and the detection of Fy was within 20%, and the nonlinearity in Fx detection was within ±1%. In this result, the detected output voltage of the bridge circuit is relatively large, and the detected interference between the detection of Fx and the detection of Fy and the detected nonlinearity are relatively small, as compared to those in the other example which will be described below.

[Second Example]

Figure 5A:
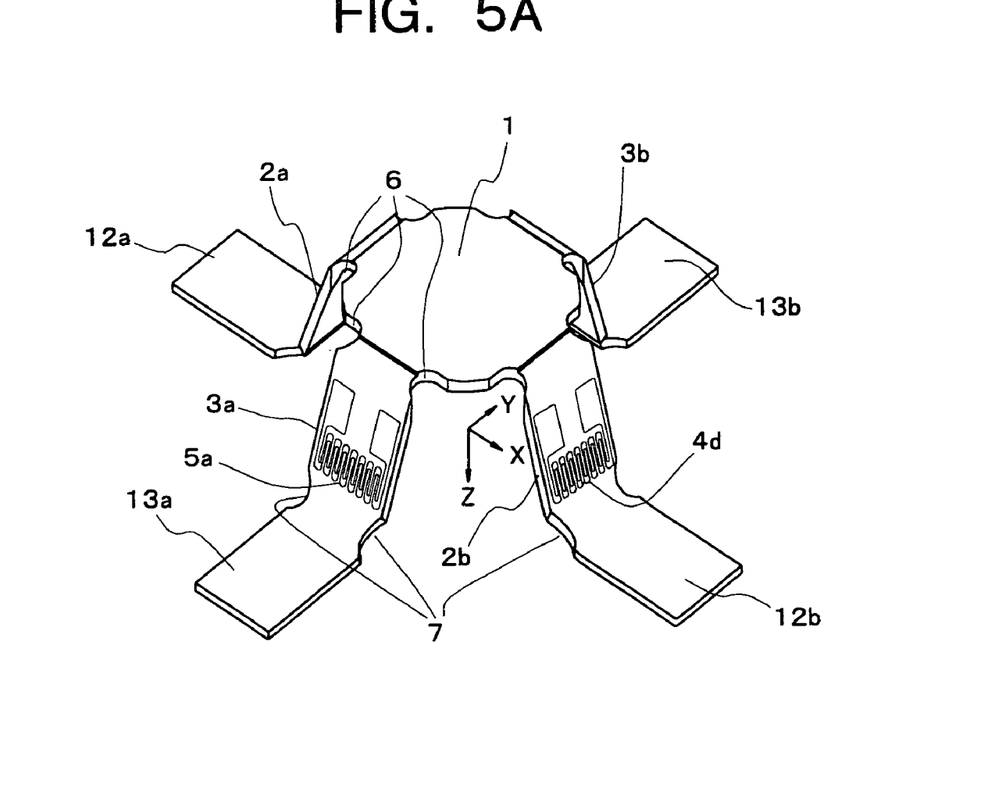
FIG. 5A and FIG. 5B are views schematically showing the tactile sensor of another embodiment according to the present invention.
Figure 5B:
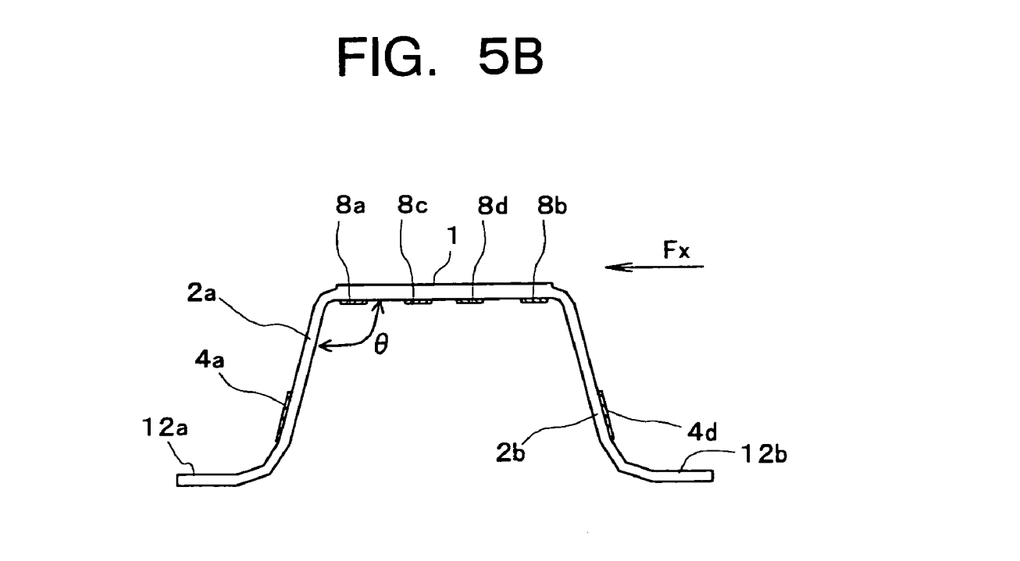

In a second example, strain gauges are attached only to single sides of strain generating sections 2a, 2b, 3a, 3b (only outside strain gauge 4a, 4d, 5a, . . . are attached), and the same structure as of the first example is adopted for the other structure. This structure is shown in FIG. 5A and FIG. 5B. FIG. 5A and FIG. 5B are views schematically showing the structure of the tactile sensor of another embodiment according to the present invention and the same reference numerals will be used to designate the corresponding components as those already described in the above.

A bridge circuit composed of strain gauges 4a, 4b is configured by replacing the strain gauges 4b, 4c in the bridge circuit shown in FIG. 4B with external fixed resistors. At the time, as in the case of the first example, a force Fx=250 g is applied in the X direction. As a result obtained from the above, the output voltage of the bridge circuit was 0.85 mV to 0.9 mV, the interference between the detection of Fx and the detection of Fy was 20% or below, and the nonlinearity was within ±1%. Since the strain gauges are mounted only on the single sides of the strain generating sections 2a, 2b, 3a, 3b, the output lowers and the detecting sensitivity comes to about a half.

[Third Example]

Figure 6A:
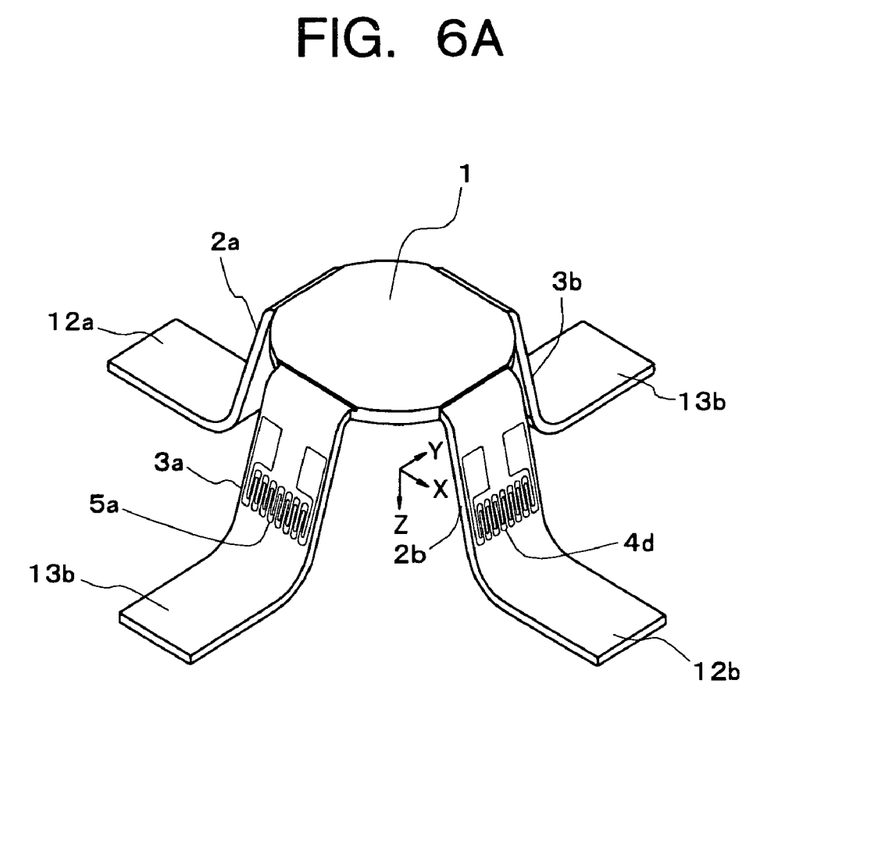
FIG. 6A and FIG. 6B are views schematically showing the tactile sensor of still another embodiment according to the present invention.
Figure 6B:
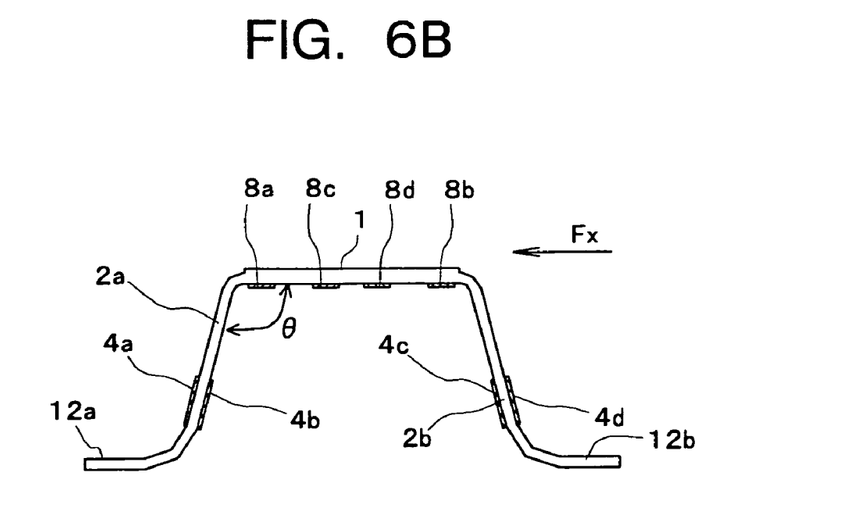

In a third example, no recessed portion is provided in the vicinity of boundaries between a strain generating section 1 and strain generating sections 2a, 2b, 3a, 3b, which are four legs, and in the vicinity of boundaries between the strain generating sections 2a, 2b, 3a, 3b and foot sections 12a, 12b, 13a, 13b. The other structure is the same as of the first example. This structure is shown in FIG. 6A and FIG. 6B. FIG. 6A and FIG. 6B are views schematically showing the structure of the tactile sensor of still another embodiment according to the present invention and the same reference numerals will be used to designate the corresponding components as those already described in the above.

As in the case of the first example, a force Fx=250 g is applied. As a result obtained from the above, the output voltage of the bridge circuit was 0.5 mV to 0.55 mV, the interference between the detection of Fx and the detection of Fy was 30% or below, and the nonlinearity was within ±2%. To the extent of providing no recessed portion, the stiffness of the strain generating sections 2a, 2b, 3a, 3b increases, so that deformation is difficult and resultant output which corresponds to strains is small. Also, the interference between the detection of Fx and the detection of Fy, and the nonlinearity show inferior result as compared to the above examples.

Figure 7A:
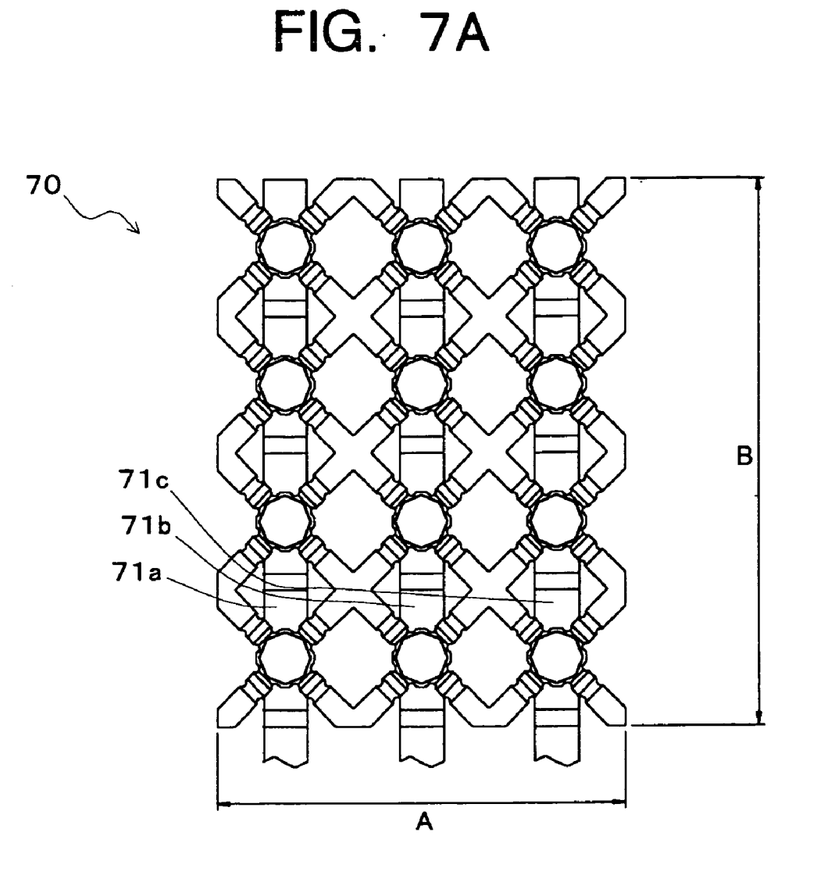
FIG. 7A and FIG. 7B are views schematically showing the structure of the tactile sensor of yet another embodiment according to the present invention.
Figure 7B:
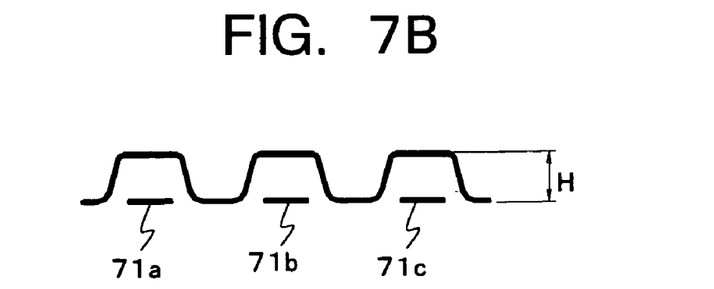

Next, a tactile sensor of yet another embodiment according to the present invention will be described with reference to FIG. 7A and FIG. 7B. FIG. 7A and FIG. 7B are views schematically showing the structure of the tactile sensor of yet another example according to the present invention. FIG. 7A is a top view and FIG. 7B is a front view.

The tactile sensor 70 of the present embodiment arranges tactile sensors shown in FIG. 1A and FIG. 1B in an array so that force distribution on an attachment surface can be detected. For instance, it is possible to obtain total of three component forces by attaching the tactile sensor to a surface or so forth of a fingertip and fixing it with a bond and the like, and by integrating the three component forces applied to entire surface of the fingertip for each component force. As shown in FIG. 7A and FIG. 7B, a tactile sensor 70 has respective tactile sensors having cross-shaped foot sections, the respective tactile sensor contacting with adjacent respective tactile sensors by mutually butting thereinto. In this case, a total of 4×3=12 pieces of array is presented. Such an array structure can be formed for example by pressing line-byline from a plate material. Alternatively, it is possible to form the array structure by pressing in unit of individual element and arranging them on a bottom plate.

Specific sizes are, for example, a lateral direction A is approximately from 10 mm to 30 mm (more specifically, for example, 15 mm), a longitudinal direction B is approximately from 15 mm to 45 mm (more specifically, for example, 20 mm), and a height H is approximately from 1 mm to 3 mm (more specifically, for example, 1.6 mm).

Further, the tactile sensors composing respective lines in the longitudinal direction are accompanied by ribbon-shaped wiring boards 71a, 71b, 71c at the under sides thereof, respectively, such that the wiring boards are fit in protrusions of discoid strain generating sections 1. The ribbon-shaped wiring boards 71a, 71b, 71c supply strain gauges mounted on the tactile sensors as elements with electrical wiring. It is omitted to illustrate here, whereas, the strain gauges and the wiring board 71a and so forth are connected for example by soldering using lead wires.

Figure 8A:
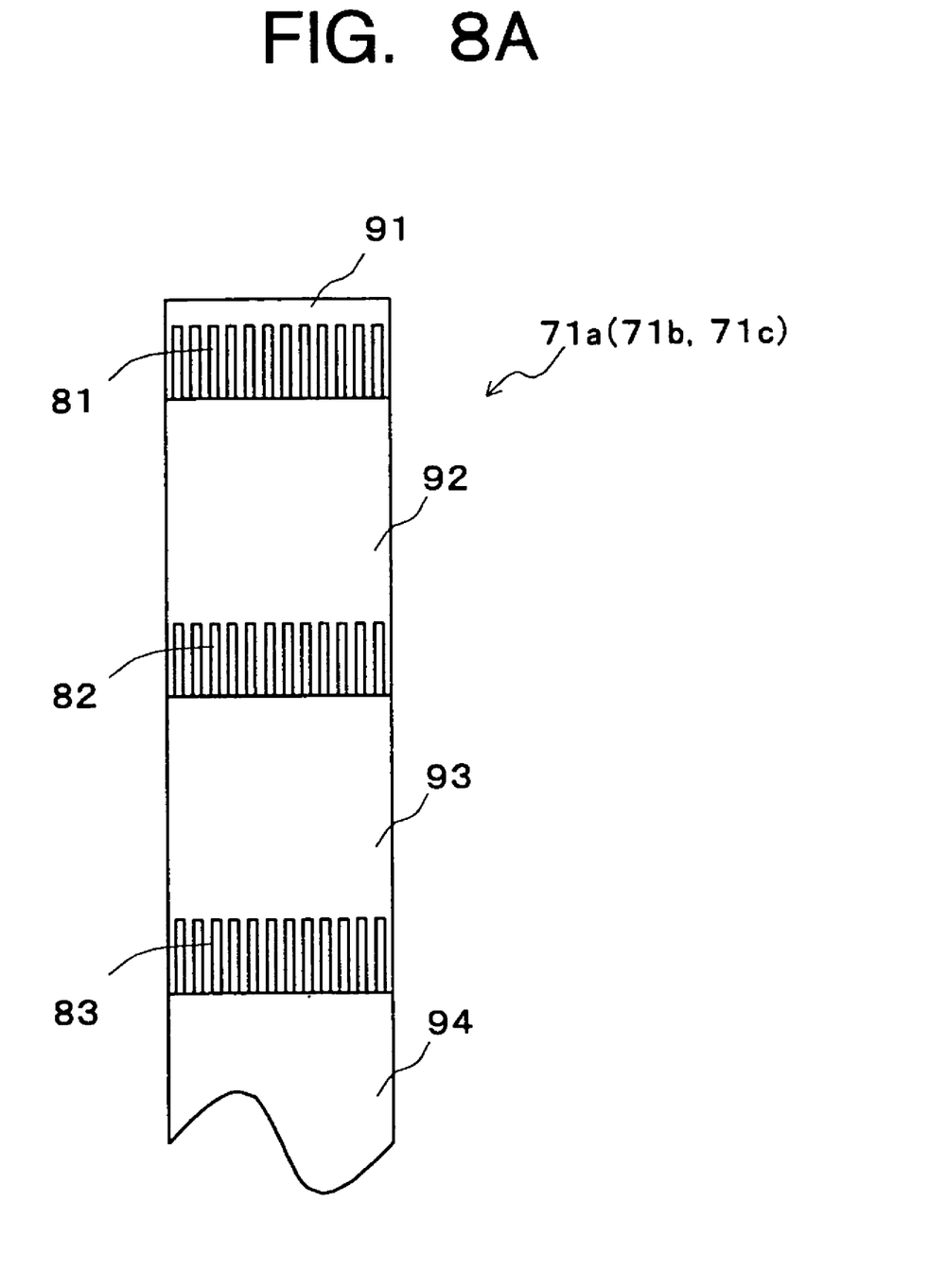
FIG. 8A and FIG. 8B are views showing the structure of a wiring board 71a (71b, 71c) shown in FIG. 7A and FIG. 7B.
Figure 8B:
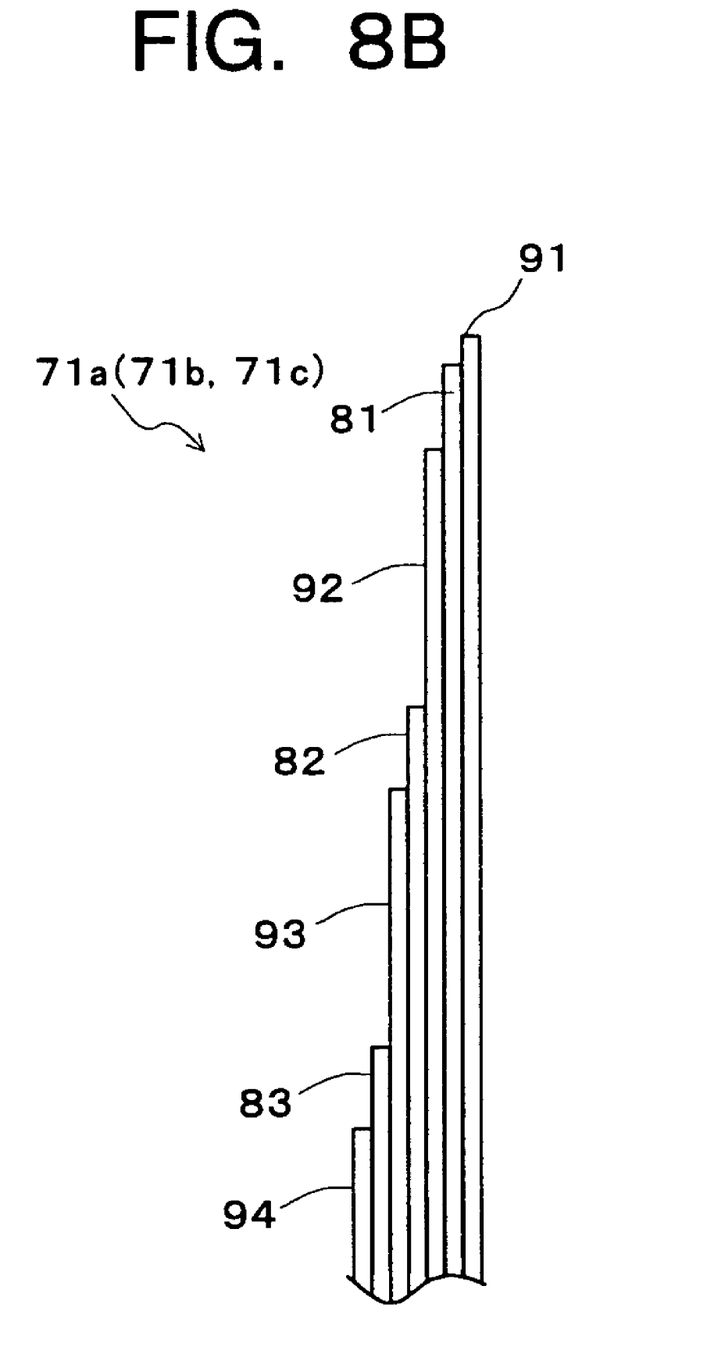

FIG. 8A and FIG. 8B are views showing the structure of the wiring board 71a (71b, 71c). FIG. 8A is a top view, and FIG. 8B is a side view. As shown in FIG. 8A and FIG. 8B, this wiring board is a kind of multi-layered wiring in which insulating layers 91, 92, 93, 94, . . . and wiring layers 81, 82, 83, . . . are structured to be layered by turns. The insulating layers 91, 92, 93, 94, . . . are made of a flexible insulating material such as polyimide, and the wiring layers 81, 82, 83, . . . are made of a conductive material such as copper. The number of the wiring layer 81, . . . is in conformity with the number of the elements in the longitudinal direction shown in FIG. 7A.

In FIG. 8A and FIG. 8B, the wiring layer 81 at a most under side is exposed at a most tip side (upper side in the drawing) thereof, and it is designed for the remaining wiring layers such that the upper the wiring layer is, the more distant the exposed portion of the wiring layer is from the tip side. The exposed portion comes to be a connection edge with respective strain gauges. With such the structure of the wiring board 71a, the wirings for the strain gauges 4a, 4b, 4c, 4d, 5a, . . . , 81 to 8d attached to each of the tactile sensors as elements can be assumed by one wiring layer for each element. This is an extremely simple structure as a wiring board, so that the wiring board can be realized at a low cost without requiring the structure of a through hole and the like even though it is a multi-layered board.

Figure 9A:
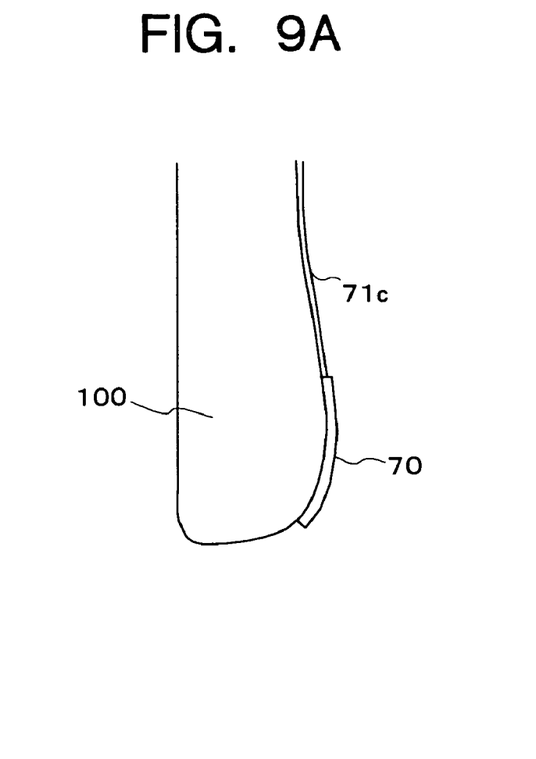
FIG. 9A and FIG. 9B are views showing the configuration in the case where a tactile sensor 70 having an array structure shown in FIG. 7A is attached to a tip of a finger portion 100 of a gripping robot.
Figure 9B:
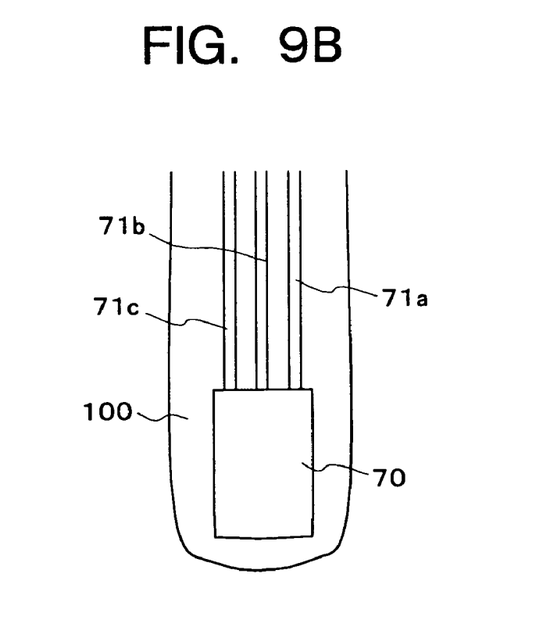

FIG. 9A and FIG. 9B are views showing the structure in the case where the tactile sensor 70 having an array structure shown in FIG. 8A and FIG. 8B is attached to a tip of a finger portion 100 of a gripping robot. FIG. 9A is a side view, and FIG. 9B is a front view, and the same reference numerals will be used to designate the corresponding components as those in FIG. 7A, FIG. 7B, FIG. 8A, and FIG. 8B.

As shown in FIG. 9A and FIG. 9B, the tactile sensor 70 having an array structure can be attached to a surface having minute curved surfaces such as a fingertip of a human such that the tactile sensor complies with the same. Accordingly, the tactile sensor is suitable for detecting a contact pressure as a variety of gripping robots. The gripping robots are expected to be put into practical use in various fields such as a laundry machine, a vending machine, a cooking device, and the like, in addition to an industrial field in the future.

It is to be understood that the present invention is not intended to be limited to the specific embodiments described in the above with reference to the drawings, but includes all modifications and so forth within the scope of the claims which will be described hereinbelow.

What is claimed is:

1. A tactile sensor, comprising:
    a first strain generating section having a shape of a disk;
    second to fifth strain generating sections each of which is provided as a plate-shaped extension of the first strain generating section extended from one of peripheral edge portions of the first strain generating section that are divided into four substantially equiangular portions, each of the second to fifth strain generating sections being structured to support the first strain generating section as a leg of the first strain generating section;
    first to fourth foot sections extended at a side different from a first strain generating section side respectively from the second to fifth strain generating sections;
    a diaphragm type first strain gauge attached to a discoid surface of the first strain generating section; and
    second to fifth strain gauges attached respectively to planer surfaces of the second to fifth strain generating sections.

2. The tactile sensor as set forth in claim 1, further comprising sixth to ninth strain gauges in addition to the second to fifth strain gauges so that each of the second to fifth strain generating sections has strain gauges attached to both the planer surfaces thereof.

3. The tactile sensor as set forth in claim 1, wherein in the structure of the second to fifth strain generating sections supporting the first strain generating section, an angle between the disk of the first strain generating section and each of the plates of the second to fifth strain generating sections is within the range from 90 degrees to 130 degrees.

4. The tactile sensor as set forth in claim 1, wherein recessed portions are formed in vicinity of extension boundaries between the first strain generating section and the second to fifth strain generating sections so as to reduce discoid surface area of the first strain generating section or plate area of the second to fifth strain generating sections.

5. The tactile sensor as set forth in claim 1, wherein recessed portions are formed in vicinity of extension boundaries between the second to fifth strain generating sections and the first to fourth foot sections so as to reduce plate area of the second to fifth strain generating sections.

6. A tactile sensor comprising tactile sensors as elements aligned in an array, each of the tactile sensors as elements includes:
    a first strain generating section having a shape of a disk;
    second to fifth strain generating sections each of which is provided as a plate-shaped extension of the first strain generating section extended from one of peripheral edge portions of the first strain generating section that are divided into four substantially equiangular portions, each of the second to fifth strain generating sections being structured to support the first strain generating section as a leg of the first strain generating section;
    first to fourth foot sections extended at a side different from a first strain generating section side respectively from the second to fifth strain generating sections;
    a diaphragm type first strain gauge attached to a discoid surface of the first strain generating section; and
    second to fifth strain gauges attached respectively to planer surfaces of the second to fifth strain generating sections.

7. The tactile sensor as set forth in claim 6, further comprising wiring boards supplying respective terminals of the strain gauges arranged respectively in the tactile sensors as elements with electrical wirings, the wiring boards including multilayered wiring layers to each of which the tactile sensor as an element is connected,
    wherein the tactile sensors as elements connected to the respective multilayered wiring layers are uniform.

8. A gripping robot comprising a tactile sensor detecting contact pressure, the tactile sensor including tactile sensors as elements aligned in an array, and each of the tactile sensors as elements contains:
    a first strain generating section having a shape of a disk;
    second to fifth strain generating sections each of which is provided as a plate-shaped extension of the first strain generating section extended from one of peripheral edge portions of the first strain generating section that are divided into four substantially equiangular portions, each of the second to fifth strain generating sections being structured to support the first strain generating section as a leg of the first strain generating section;
    first to fourth foot sections extended at a side different from a first strain generating section side respectively from the second to fifth strain generating sections;
    a diaphragm type first strain gauge attached to a discoid surface of the first strain generating section; and
    second to fifth strain gauges attached respectively to planer surfaces of the second to fifth strain generating sections.

* * * * *